US010931210B2

(12) United States Patent
Arnett et al.

(10) Patent No.: US 10,931,210 B2
(45) Date of Patent: Feb. 23, 2021

(54) ENERGY HARVESTING USING KINETIC FABRIC

(71) Applicant: Glen Raven, Inc., Glen Raven, NC (US)

(72) Inventors: Cameron Andrews Arnett, Burlington, NC (US); Harold W Hill, Jr., Burlington, NC (US); Elizabeth Paige Mullis Enochs, Greensboro, NC (US); Nan-Wei Gong, Cambridge, MA (US)

(73) Assignee: Glen Raven, Inc., Glen Raven, NC (US)

( * ) Notice: Subject to any disclaimer, the term of this patent is extended or adjusted under 35 U.S.C. 154(b) by 68 days.

(21) Appl. No.: 16/446,152

(22) Filed: Jun. 19, 2019

(65) Prior Publication Data
US 2019/0393805 A1 Dec. 26, 2019

Related U.S. Application Data

(60) Provisional application No. 62/687,327, filed on Jun. 20, 2018.

(51) Int. Cl.
*H02N 1/04* (2006.01)
(52) U.S. Cl.
CPC ..................... *H02N 1/04* (2013.01)
(58) Field of Classification Search
CPC .. H02N 1/04; H02N 1/00–1/12; D03D 1/0088

USPC .................................. 310/300, 309
See application file for complete search history.

(56) References Cited

U.S. PATENT DOCUMENTS

| | | |
|---|---|---|
| 9,279,734 B2 | 3/2016 | Walker |
| 9,287,487 B2 | 3/2016 | Bae et al. |
| 2016/0276568 A1 | 9/2016 | DeFranks et al. |
| 2017/0029985 A1 | 2/2017 | Tajitsu et al. |
| 2017/0146493 A1 | 5/2017 | Passmore et al. |
| 2017/0163178 A1 | 6/2017 | Dabby et al. |
| 2017/0254336 A1 | 9/2017 | Nguyen |
| 2017/0271922 A1 | 9/2017 | Kim et al. |
| 2019/0356243 A1* | 11/2019 | Zhi .................... A41D 31/00 |

* cited by examiner

*Primary Examiner* — Thomas Truong
(74) *Attorney, Agent, or Firm* — Adams Intellex, PLC

(57) ABSTRACT

Techniques for energy production are disclosed. A kinetic fabric for use in a kinetically-activated energy production system is implemented. The kinetic fabric comprises a three-dimensional, layer-based flexible matrix that regains shape after deformation. The fabric further comprises a kinetically activated energy source layer supported between layers of the flexible matrix. The fabric further includes a flexible electrical connection that provides an electrical path between the energy source layer and a terminal on the flexible matrix. The kinetic fabric is deformed with mechanical agitation, and energy is harvested from the energy source layer through the terminal on the flexible matrix. Various embodiments are disclosed including flags, moving vehicles, and shade structures, among others.

24 Claims, 7 Drawing Sheets

ENERGY HARVESTING USING KINETIC FABRIC

RELATED APPLICATIONS

This application claims the benefit of U.S. provisional patent application "Energy Harvesting Using Kinetic Fabric" Ser. No. 62/687,327, filed Jun. 20, 2018.

The foregoing application is hereby incorporated by reference in its entirety.

FIELD OF ART

This application relates generally to energy production and more particularly to energy harvesting using kinetic fabric.

BACKGROUND

Recent advances in energy storage and production technology and the ongoing drive for energy efficiency, have allowed individuals in the $21^{st}$ century to make use of technology that was previously relegated to the pages of science fiction novels and research facilities with high-powered supercomputers. For example, rather than using a sextant for marine navigation, seafarers now routinely use the Global Positioning System (GPS) to accurately and precisely identify their position and current heading, often accessing this technology with hand-held, battery-powered devices. The same devices used for determining geolocation with GPS can often also be used to capture digital photographs, communicate with others by voice or text, or even control navigation. For example, a mobile phone can be configured to act as a marine navigation system that can control a rudder angle and/or an engine throttle in a marine vessel. If desired, such a system can be configured to follow a predefined course, chart a course to a preselected destination, or even automatically avoid storms, choppy water, other vessels, or high-traffic marine transportation corridors. However, failure of such a system can lead to catastrophic results.

One drawback and potential cause of failure of modern technology is that it nearly always requires electricity to function. With populations surging and natural resources dwindling, industrial energy production is becoming more expensive and less environmentally friendly. However, energy production is more crucial than ever before, due to burgeoning global populations and their increasing reliance on modern technology. Without electric power, communities that rely on electricity for traffic control systems, communication systems, climate control, and lighting can be rendered nearly helpless. When modern communities experience extended durations without electric power, resulting food or water shortages may cause social unrest or worse and the safety and security of the communities can be significantly compromised. As such, a reliable source of electric power has become a linchpin of modern society, and much effort has been invested in developing power generation and distribution systems with high redundancy and high reliability. Unfortunately, reliable electric power still typically requires a physical connection (e.g., power lines) to an electric power generator (e.g., a power plant).

When an individual no longer has access to reliable electric power through a physical connection to an electric power generator, solar power and/or battery technology are often used to provide a baseline amount of electricity that may be required for essential functions, such as navigation or communication. However, solar power is notoriously unreliable, as it can only produce significant amounts of power during the day when the sun is not occluded by clouds or other physical barriers. Further, although batteries fabricated using high-quality materials can be extremely reliable, they are often very heavy and typically do not hold charge indefinitely due to inherent leakage currents. Thus, a large array of solar panels and/or a large array of batteries can be required to ensure the availability of reliable electric power, even if only a small amount of power is expected to be drawn from the batteries. Unfortunately, in many cases, using a large array of solar panels and/or a large array of batteries can be impossible or extremely undesirable.

Returning to the example of a marine vessel, the speed of a marine vessel is often approximately inversely proportional to the weight of the vessel, and so minimizing the weight of the vessel and its contents can reduce travel time. As batteries are typically heavy, mariners who are on a schedule or otherwise wish to minimize travel time often seek to also minimize the amount of batteries that must be stowed for a voyage. As another example, commercial truck drivers may wish to retain reliable access to electric power when parked at rest stops and may need to rely on auxiliary battery power to do so. Using their truck's battery to charge devices or run a climate control system can be a liability, as unintentionally draining the truck's battery could render the truck inoperable until the battery is recharged. Leaving the engine idling is often not an option, as engine idling wastes fuel, contributes to environmental pollution, and is prohibited in an increasing number of localities. As such, truck drivers may use auxiliary batteries, such as one or more portable batteries or battery arrays, to charge devices and operate climate control systems while their trucks are parked. However, truck drivers must keep their truck's weight under established highway limits and are therefore limited in the amount of auxiliary batteries they can carry.

Wind power is typically no more reliable than solar power, in that wind and solar power can only be collected in meaningful amounts when the wind is blowing or the sun is shining. Further, wind turbines are typically large, expensive, and require regular maintenance in order to continue functioning properly. Slight breezes are typically insufficient to cause wind turbines to rotate and strong winds may damage the turbine. As such, nearly ideal conditions are needed to generate power using wind turbines. Thus, wind power can be as unreliable as solar power despite the advantage of being able to operate through the night when conditions are appropriate. Accordingly, in order to provide enough reliable power for a recreational mariner to safely communicate, navigate, and perform other vital functions, or for residents of an off-grid community to maintain a functioning society, a large array of batteries is required to ensure reliable electric power availability when traditional solar panels or wind turbines are used.

In view of the above-noted shortcomings of modern power generation and storage, new methods of producing and/or storing energy are needed in order to make reliable electric power available to individuals who would otherwise have no or limited access to electric power. Preferably, the methods should utilize renewable energy sources that are more reliable and require less battery storage than typical solar or wind power systems. Through the use of such methods, reliable electric power can be provided to a large group of individuals ranging from recreational mariners to residents of permanent off-grid settlements, among others.

SUMMARY

In one aspect, the present disclosure is directed to a method for energy production comprising: implementing a kinetic fabric for use in a kinetically-activated energy production system, wherein the kinetic fabric comprises: a three-dimensional, layer-based flexible matrix, wherein the flexible matrix regains shape after deformation; a kinetically activated energy source layer, wherein the energy source layer is supported between layers of the flexible matrix; and a flexible electrical connection providing an electrical path between the energy source layer and a terminal on the flexible matrix; deforming the kinetic fabric with mechanical agitation; and harvesting energy from the energy source layer through the terminal on the flexible matrix.

In another aspect, the present disclosure is directed to an apparatus for energy production comprising: a kinetic fabric for use in a kinetically-activated energy production system, wherein the kinetic fabric comprises: a three-dimensional, layer-based flexible matrix, wherein the flexible matrix regains shape after deformation; a kinetically activated energy source layer, wherein the energy source layer is supported between layers of the flexible matrix; and a flexible electrical connection providing an electrical path between the energy source layer and a terminal on the flexible matrix.

In yet another aspect, the present disclosure is directed to a computer system for energy production comprising: a memory which stores instructions; one or more processors attached to the memory wherein the one or more processors, when executing the instructions which are stored, are configured to: implement a kinetic fabric for use in a kinetically-activated energy production system, wherein the kinetic fabric comprises: a three-dimensional, layer-based flexible matrix, wherein the flexible matrix regains shape after deformation; a kinetically activated energy source layer, wherein the energy source layer is supported between layers of the flexible matrix; and a flexible electrical connection providing an electrical path between the energy source layer and a terminal on the flexible matrix; and harvest energy from the energy source layer through the terminal on the flexible matrix while the kinetic fabric is deformed with mechanical agitation.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
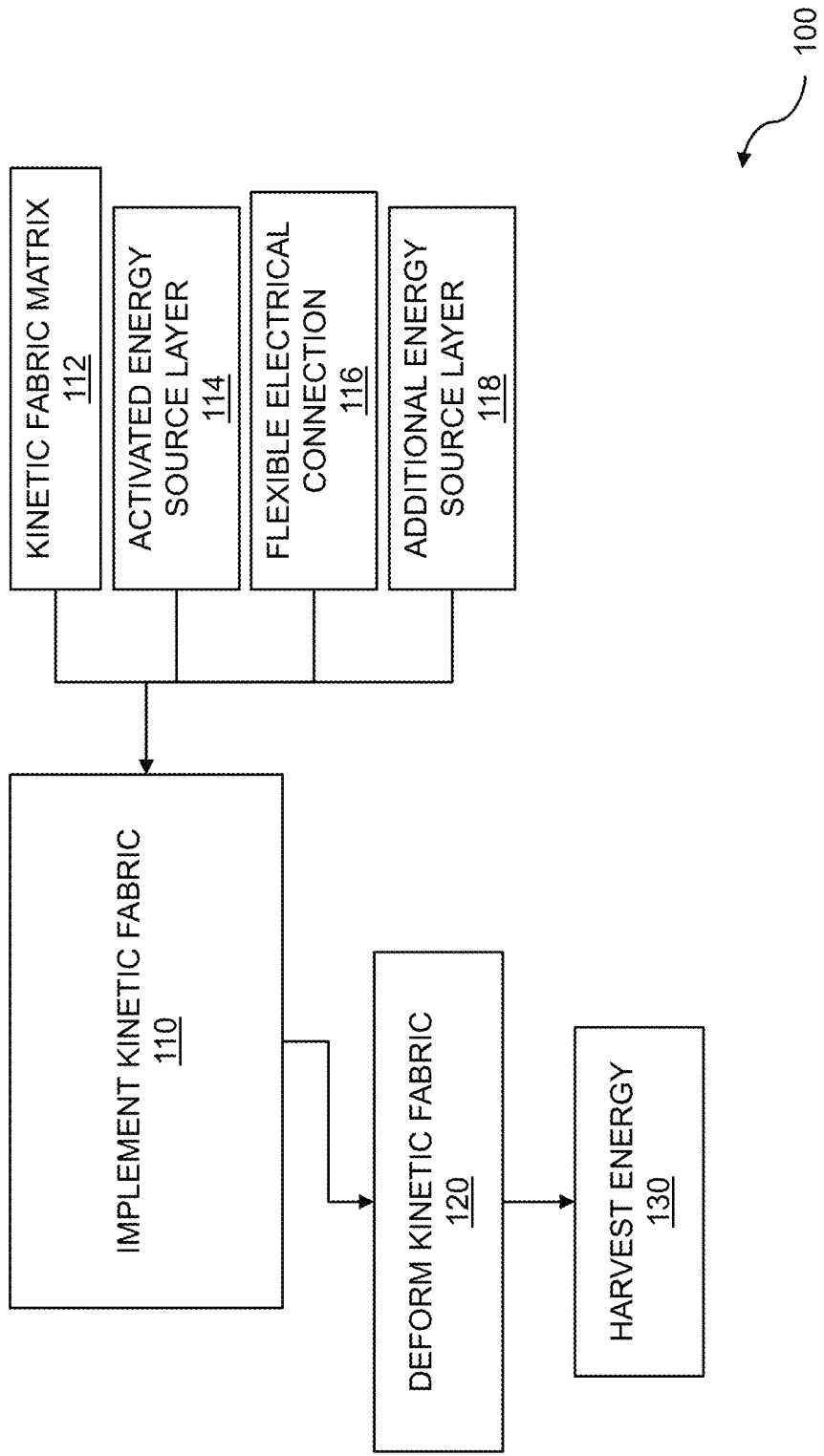
FIG. 1 is a flow diagram for energy harvesting using kinetic fabric.

Aspects of the present disclosure relate to systems, methods, apparatuses, and software for energy harvesting using kinetic fabric. Extremely efficient and reliable techniques for generating power by harvesting energy using kinetic fabric are disclosed. These techniques can enable users to maintain a reliable source of electric power without requiring the use of a large array of batteries, let alone any wind turbines or solar panels. When kinetic fabrics made in accordance with the teachings herein are deformed with mechanical agitation, they produce a voltage that can be used to charge an energy storage system such as a battery. Through the use of kinetic fabrics, latent energy sources that previously could not have efficiently exploited, such as low velocity winds or low energy waves in bodies of water, can now be effectively harvested.

Kinetic fabrics like those disclosed herein can be used to produce electric power by harvesting energy from any source capable of deforming the kinetic fabric with mechanical agitation. For example, a kinetic fabric may be embedded in or used as a sail on a boat, a flag, or even a piece of clothing, and can be deformed by wind or an individual's movements. Kinetic fabrics may be used to line a creek bottom or may be suspended in the atmosphere and/or the ocean, where they can be deformed by currents, winds, waves, or tides. Industrial scale kinetic fabrics may be used in or as retractable roofs for stadiums or carpets in public buildings or public transportation vehicles. Fundamentally, implementation of a kinetic fabric made in accordance with the present disclosure can include manufacturing or using a kinetic fabric having various ones of the characteristics described herein in any way. For example, kinetic fabrics may be manufactured using any desired material and can be deformed with any desired mechanical agitation, provided that the kinetic fabric can be used to produce electric power as described herein.

When kinetic fabrics are deformed with mechanical agitation, one or more energy source layers within the kinetic fabric produce a voltage that can be harvested and stored in an energy storage system. The energy source layer may contain piezoelectric materials that produce a voltage when they are compressed, triboelectric materials that produce a voltage when they come into frictional contact, or a combination of two or more of piezoelectric, triboelectric, and thermoelectric materials. After the voltage produced by the kinetic fabric is stored in an energy system, the energy system can be used to provide electric power to one or more systems or devices.

By using techniques like those disclosed herein, users can reliably and efficiently produce and store energy harvested from latent energy sources without having to obtain, carry, or maintain an unwieldy array of batteries. By using these techniques, fewer batteries can be used to maintain the same level of electric power reliability as a traditional wind or solar power installation with a large array of batteries. Users of the systems and methods disclosed herein can eliminate weight and expense that may otherwise be associated with electric power systems without sacrificing a robust and reliable supply of power. Further, by using a larger amount of battery storage and adding a kinetic fabric system to charge the batteries instead of or in addition to a traditional wind or solar power system, the reliability of the electric power made available by the system can be significantly increased.

Turning now to the drawings, FIG. 1 is a flow diagram 100 for energy harvesting using kinetic fabric. The flow 100 includes implementing a kinetic fabric 110 for use in a kinetically-activated energy production system. A manufacturer may implement a kinetic fabric, for example, by producing a kinetic fabric for selling to a retailer or wholesaler. After sale to an end-user, the end-user may implement the kinetic fabric by configuring and arranging it to harvest energy. Implementation of a kinetic fabric includes any activity that produces or uses a kinetic fabric in accordance with the teachings herein. By implementing a kinetic fabric with a three-dimensional, layer-based flexible matrix 112, a kinetically activated energy source layer 114 can be supported between layers of the matrix. Attaching a flexible electrical connection 116 between the energy source layer and a terminal on the flexible matrix 112 enables energy to be harvested 130 from the energy source layer through the terminal on the matrix when the kinetic fabric is deformed 120 with mechanical agitation.

Kinetic fabrics may be used in any of a number of ways, as described briefly above, and may be coupled to a moving vehicle, part of a piece of furniture, or part of a shade structure in some embodiments. For example, a kinetic fabric may be used in a tarp for covering a dump truck, in curtains on a curtain sided semi-trailer, in fabric disposed in front of a vehicle's radiator, or in a convertible car's "soft-top" fabric roof. As air travels over and/or through the kinetic fabric, movement in the fabric can be converted into electric power using techniques disclosed herein. Fundamentally, a kinetic fabric can be used in any place where it will be deformed with mechanical agitation, such as in a rug, a cushion, a bed, or an umbrella. A rug with kinetic fabric may produce energy when walked upon, while a cushion or bed may produce electricity when a user deforms the surface or interior through normal use. A kinetic fabric built into or functioning as an awning or umbrella may produce electricity due to mechanical agitations caused by wind or precipitation. Thus, deformation of a kinetic fabric by mechanical agitation may be accomplished using a natural energy source such as wind or water or the actions of a person or animal, such as body movements or footsteps. In embodiments, deformation includes periodic, if irregular, mechanical agitation of a kinetic fabric, such as vibration, rumble, trembling, twitching, or jiggling. The frequency of such vibrations can vary from very slow sub-Hertz frequencies to very high Hertz frequencies at the upper physical mass limit of mechanical vibrations, such as the tens of thousands of RPM achievable by nanoscale micro-machines or sub-cellular biological structures.

A kinetic fabric with a three-dimensional, layer-based flexible matrix 112 may be manufactured using any one or more materials, including but not limited to one or more plastics, metals, or polymers. Carbon fiber reinforcement may be used in lighter-weight materials like plastics or polymers to add structural support and durability. The flexible matrix 112 is resilient and regains its shape, i.e., returns to a resting position, after deformation. The flexible matrix 112 may comprise a substantially non-stretchable material having low elasticity, such as sailcloth or canvas. In some embodiments, the flexible matrix 112 may be implemented as a honeycomb structure comprising strips of material welded or otherwise attached together, optionally at regular intervals, such that gaps between the welded strips of material form the "cells" of the honeycomb. The cells can take any suitable shape, and may be substantially hexagon-shaped, diamond-shaped, oval-shaped, or circle-shaped, among others. The flexible matrix 112 may comprise one or more helical structures.

The flexible matrix 112 may be collapsible such that adjoining layers can be selectively laid flat against one another and then re-expanded to form cells of one or more sizes. The mechanical agitation of the flexible matrix 112 may include the application of a centripetal force against the matrix, contact forces on the matrix, or curvilinear motion of the matrix, depending on how the matrix is used. For example, curvilinear motion of the flexible matrix 112 may be caused by wind or waves rippling the matrix, while centripetal force may result from attachment of the fabric to a spinning body. In some embodiments, the flexible matrix 112 may comprise or be modeled after the StrataWeb™ Cellular Confinement System, available from Strata Systems, Inc., Glen Raven, N.C.

A kinetically activated energy source layer 114 can include any number of structures or materials that enable energy to be harvested through a terminal on the flexible matrix 112 when the matrix is deformed with mechanical agitation. For example, kinetically activated materials such as piezoelectric, triboelectric, and/or thermoelectric materials may be used. In some embodiments, the energy source layer 114 may include a piezoelectric layer and/or a triboelectric layer. To improve reliability and to optimize power generation, the energy source layer 114 may include two or more of piezoelectric, triboelectric, and thermoelectric materials. By including two or more types of materials that can generate power when they or a flexible matrix 112 to which they are attached are deformed by mechanical agitation, reliability can be improved and power generation can be optimized.

In some embodiments, the energy source layer 114 may be implemented on or as the flexible matrix 112. The energy source layer 114 may be implemented as individual dots, as a film, or as other deposits or forms of kinetically activated material disposed in operative relation with the flexible matrix 112. In some embodiments, the kinetic fabric may include additional kinetically activated energy source layers 118, which may be interspersed within the flexible matrix 112.

Piezoelectric materials used in the energy source layer 114 may include natural piezoelectric substrates, such as: single crystal quartz; piezoelectric ceramics, such as lithium niobate, gallium arsenide, zinc oxide, aluminum nitride and lead zirconate-titanate; and/or polymer-film piezoelectrics, such as polyvinylidene fluoride. Particular piezoelectric materials may be selected depending on design requirements, such as intended operating conditions, environmental conditions, and service life for a particular system. For example, selecting a piezoelectric material with a high piezoelectric voltage constant relative to single crystal quartz, such as one or more polymer-film piezoelectrics, may maximize the electric field, and thus the voltage, generated by the piezoelectric material per unit of applied mechanical stress. However, such films may require custom fabrication and/or may be more sensitive to changes in environmental conditions, and so piezoelectric materials should be judiciously selected in order to maximize power while also ensuring reliability and longevity of the resulting system.

Triboelectric materials used in the energy source layer 114 may include polyamide, polytetrafluoroethylene, polyvinylidene fluoride, silk, polyurethane, nylon, glass, ebonite, silicone rubber, silicon, and/or polyvinyl chloride, among other triboelectric materials. The triboelectric materials may be incorporated into a plurality of nanoscale generators or otherwise arranged within the energy source layer 114 such that a voltage is generated when the energy source layer is deformed with mechanical agitation. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
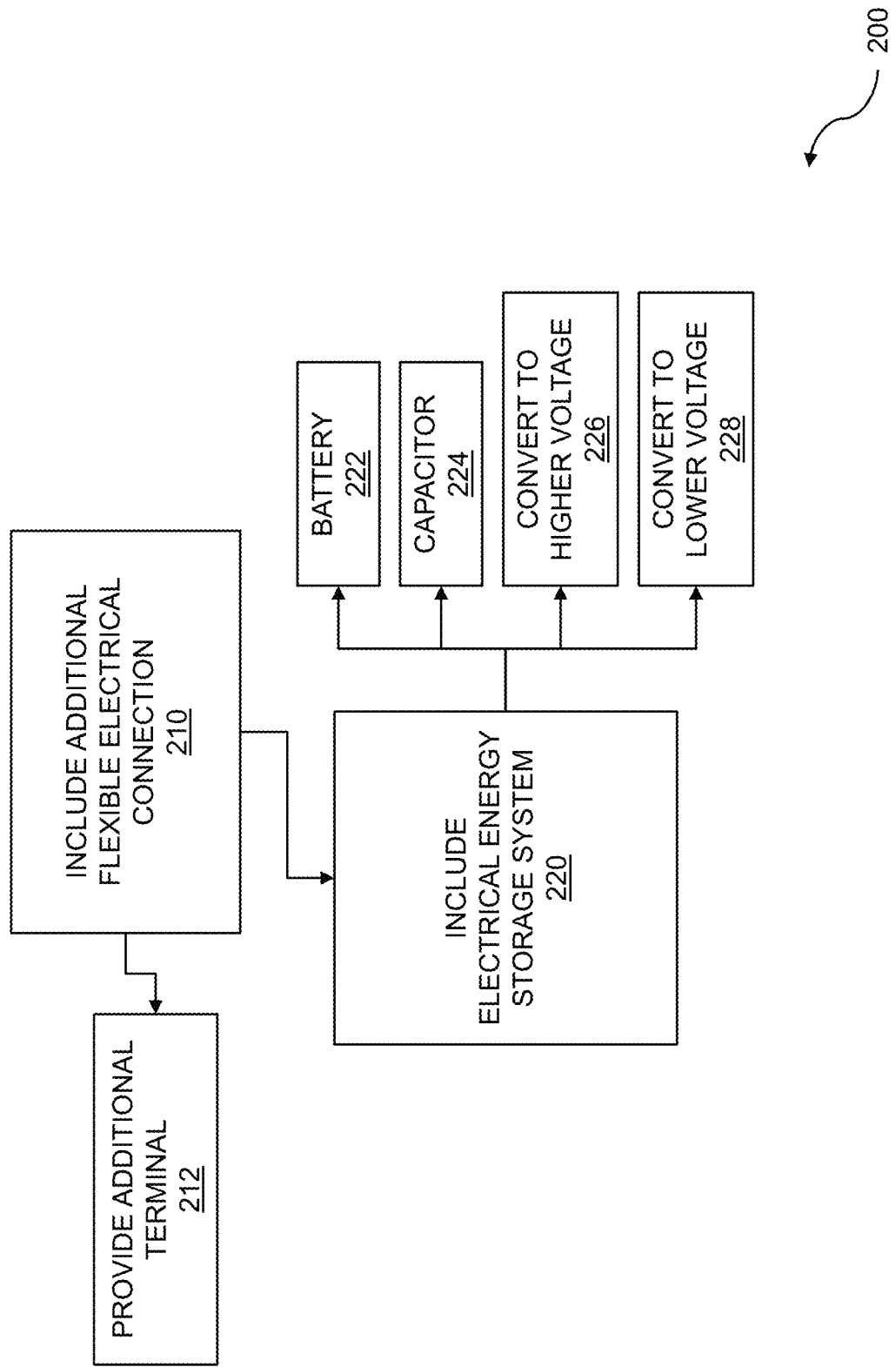
FIG. 2 is a flow diagram for energy storage.

FIG. 2 is a flow diagram 200 for energy storage. The flow 200 provides for including an additional flexible electrical connection 210 that provides an additional terminal 212 on the previously described flexible matrix. The flexible electrical connection can be used to extract energy from the energy source layer using the voltage produced across the two terminals. In other embodiments, a single terminal may be provided on the flexible matrix for energy extraction and a circuit node that might otherwise be made available through an additional terminal may be attached to an electrical ground, such as an earth ground or a chassis ground.

The flow 200 further provides for including an electrical energy storage system 220 in the form of a battery 222 or a capacitor 224. The battery 222 may comprise a lead acid gel, lithium-ion, nickel-cadmium, nickel metal hydride, or a vale-regulated lead acid battery, among others. Batteries 222 may be implemented individually or as an array or number of arrays. In some embodiments, batteries 222 or capacitors 224 may be co-located with the flexible matrix 112. Capacitors 224 used in an electrical energy storage system 220 may include one or more large individual capacitors or an array or number of arrays of large or small capacitors. Batteries 222 or capacitors 224 may be shielded from any potential electromagnetic interference, if necessary, and may be disposed in a cooling chamber or otherwise cooled to prevent heat damage and optimize efficiency and longevity. For example, on a marine vessel, batteries may be stored near the bottom of the hull, where the temperature should be coolest. In a truck, the batteries may need to be stored in the truck's cabin to prevent overheating in warmer climates but may be stored outside the cabin when ambient temperatures are low enough or air movement along the truck is sufficient to keep the batteries cool. Generally, batteries and capacitors can be stored in any appropriate location provided that they can store energy received from the energy source layer.

In some embodiments, the electrical energy storage system 220 may require conversion of a higher voltage developed across the first and second terminals to a lower voltage 228. Additionally or alternatively, the electrical energy storage system 220 may require conversion of a lower voltage developed across the first and second terminals to a higher voltage 226. By enabling one or both of these conversions, power may be more efficiently or more regularly stored in the energy storage system 220, depending on the characteristics and requirements of the energy storage system. In some embodiments, voltages provided by the energy storage system 220 can be selectively converted to higher or lower voltages on demand in order to provide one or more appropriate voltages for various devices or applications. For example, a lower voltage may be required to charge a mobile device and a higher voltage may be required to jump start a vehicle or operate a climate control system. By enabling a user to select one or more appropriate voltages for the energy storage system 220 to provide power through one or more appropriate terminals or outlets, the utility and adaptability of the energy storage system can be maximized. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
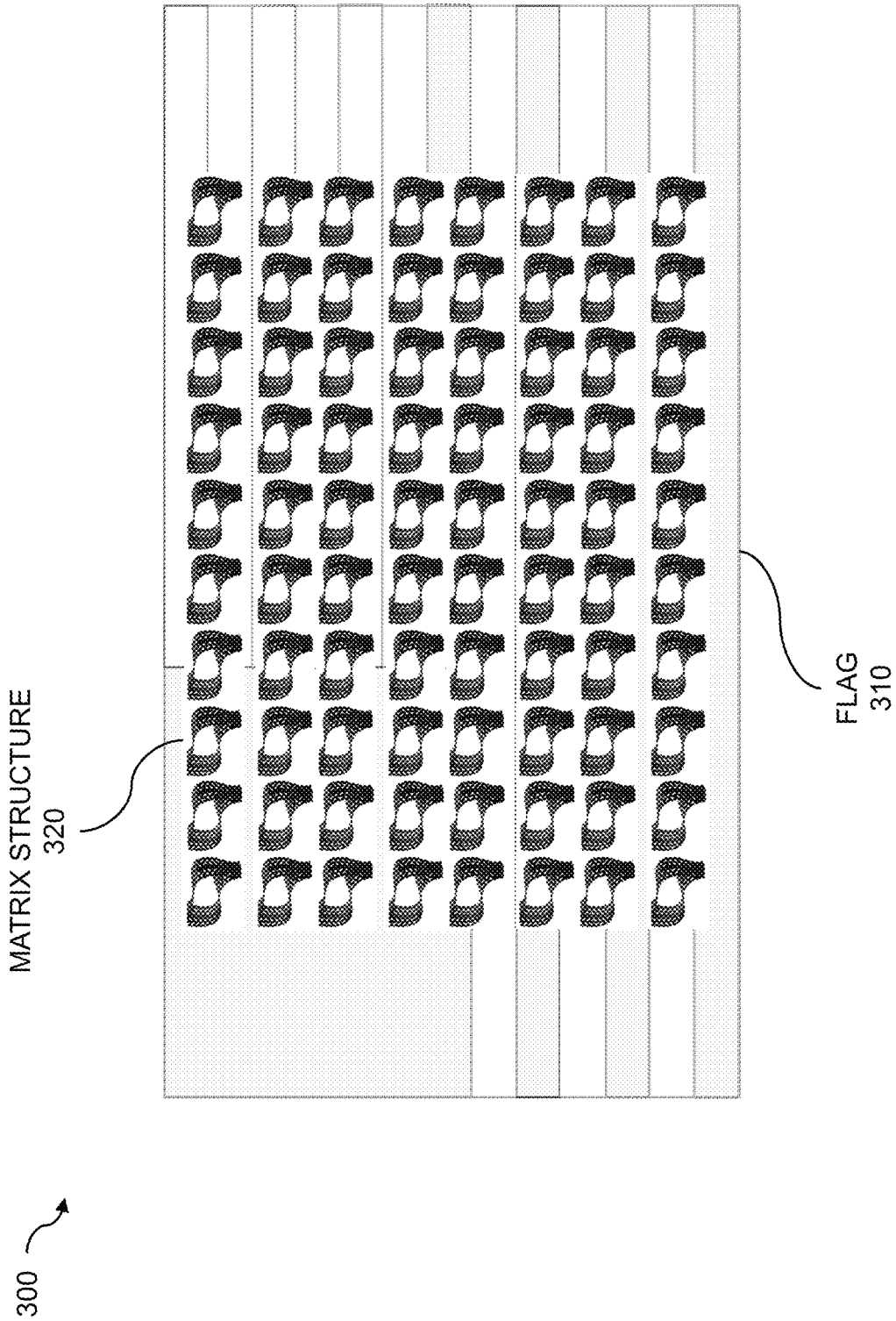
FIG. 3 shows an electricity generation structure with a flag.

FIG. 3 shows an electricity generation structure 300 with a flag 310. Among other means for attachment, the matrix structure 320 may be sewn into, woven into, plated onto, or laminated onto a fabric, such as the flag 310. By securing the matrix structure 320 to the flag 310, additional energy can be captured, as the length and width of the flag are larger than the length and width of the matrix structure, respectively. This enables additional energy to be captured because forces applied to the flag 310 but not to the matrix structure 320 may nonetheless cause the flag to wave or ripple, which may in turn cause the matrix structure to be deformed, enabling energy production. To take advantage of this effect, in some embodiments, the matrix structure 320 may be disposed closer to or along a substantially unhindered edge of a fabric to which it is attached. For example, the flag 310 in FIG. 3 may be attached to a flagpole on the left-hand side. In order to extract a large amount of energy without adding undue weight to the flag 310, which could otherwise limit energy production, the matrix structure 320 may be disposed along the right-hand edge of the flag and/or the top and bottom edges of the flag. In this way, the center of the flag can maintain its flexibility and, thus, its ability to capture energy from air movement. Movement is still allowed in the unhindered right-hand edge and/or the substantially unhindered top and bottom edges, which are primarily only constrained at their left-most points by the attachment of the flag 310 to the flagpole.

As described above, a matrix structure 320 may comprise a honeycomb structure consisting of strips of material welded or otherwise attached together to form cells. In some embodiments, the honeycomb structure may be substantially aligned along a single axis, as shown in FIG. 3. For example, a flagpole or ship's mast may constrain the matrix structure 320 such that it is substantially aligned along a single axis (e.g., the axis defined by the flagpole or mast). In some embodiments, the matrix structure 320 and corresponding honeycomb structure may be substantially aligned along two or more axes. For example, a mast and a boom on a sailboat may keep a matrix structure 320 embedded in or functioning as a sail substantially aligned with both the mast and the boom such that it is substantially aligned along two axes. By aligning the matrix structure 320 along one or more axes, the matrix structure can be arranged to produce an optimal amount of energy. In embodiments, a flag substantially aligned along the axis of a flagpole is able to flutter in the wind, while a sail substantially aligned along the axes of a mast and a boom is able not only to capture energy from the wind, but also to be redirected as necessary when conditions change.

The honeycomb structure may have one dimension which is substantially smaller or shorter than another dimension. As shown in FIG. 3, the matrix structure 320 and honeycomb structure may form a kinetic fabric that is longer than it is wide. As another example, the matrix structure 320 and honeycomb structure may form a kinetic fabric with equal width and length but having a substantially smaller thickness than its width or length. In this way, the kinetic fabric can be implemented as a thin sheet of material that can be used in tight spaces or stored in a compact fashion.

Figure 4:
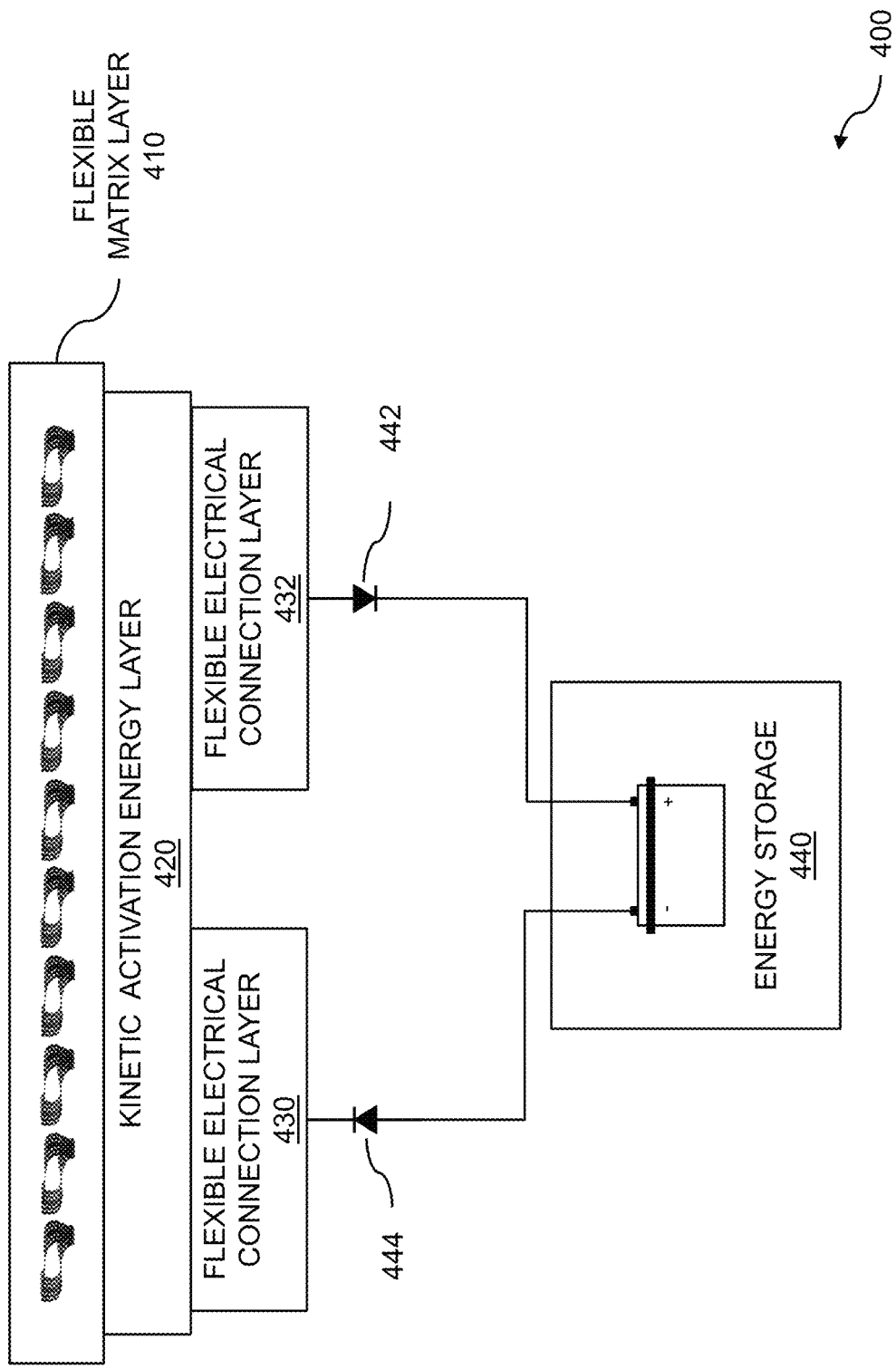
FIG. 4 illustrates a structure of a matrix, energy layer, and connector.

FIG. 4 illustrates a structure 400 of a matrix layer 410, kinetic activation energy source layer 420, and flexible electrical connection layers 430, 432 which are operable to provide energy from the energy source layer to energy storage 440. The flexible electrical connection layers 430, 432 may include one or a plurality of flexible electrical connections. In some embodiments, the flexible electrical connection layers 430, 432 may include one or more flex printed circuits, flexible conductive films or wires, and/or swivel or ball joints. One or more of the flexible electrical connections may comprise a terminal on the matrix layer 410 and/or on the kinetic activation energy source layer 420.

The terminal may be co-located with one or more of the flexible electrical connection layers 430, 432.

In some embodiments, the flexible electrical connection layers 430, 432 may be integrally formed with one or more of the matrix layer 410 and kinetic activation energy source layer 420. For example, the matrix layer 410 and/or energy source layer 420 may comprise flexible electrical connections as a consequence of the physical implementation and layout of the matrix layer or energy source layer without requiring the use of any additional electrical connection components. In some embodiments, the energy source layer 420 may implement the matrix layer 410 and electrical connection layers 430, 432 without requiring any additional structures. In other embodiments, the electrical connection layers 430, 432 may comprise one or more electrical terminals or universal serial bus (USB) terminals, among others.

In some embodiments, a voltage is generated between two or more of the flexible electrical connections when the matrix layer 410 is deformed with mechanical agitation. In other embodiments, a voltage may be generated between one or more of the flexible electrical connections and an electrical ground. The voltage may provide power to energy storage 440, which may comprise a capacitor or a battery. The flexible electrical connection layers 430, 432 may comprise conductive yarn or other appropriate conductors and may include one or more diodes 442, 444 for conditioning energy created by the energy source layer. In some embodiments, more complex conditioning systems may be used to maximize energy harvesting efficiency or utility. For example, a power conditioning unit could be used so that useful energy can be derived from the energy source layer 420 regardless of whether a positive or negative voltage is generated on one or more terminals.

In some aspects, as shown for example in FIG. 4, the present disclosure is directed to an apparatus for energy production. The apparatus includes a kinetic fabric, which may be implemented as structure 400 of FIG. 4, for use in a kinetically-activated energy production system. The kinetic fabric includes a three-dimensional, layer-based flexible matrix layer 410 that regains shape after deformation, a kinetically activated energy source layer 420 supported between layers of the matrix; and a flexible electrical connection layer 430, 432 providing an electrical path between the energy source layer and a terminal on the matrix.

Figure 5:
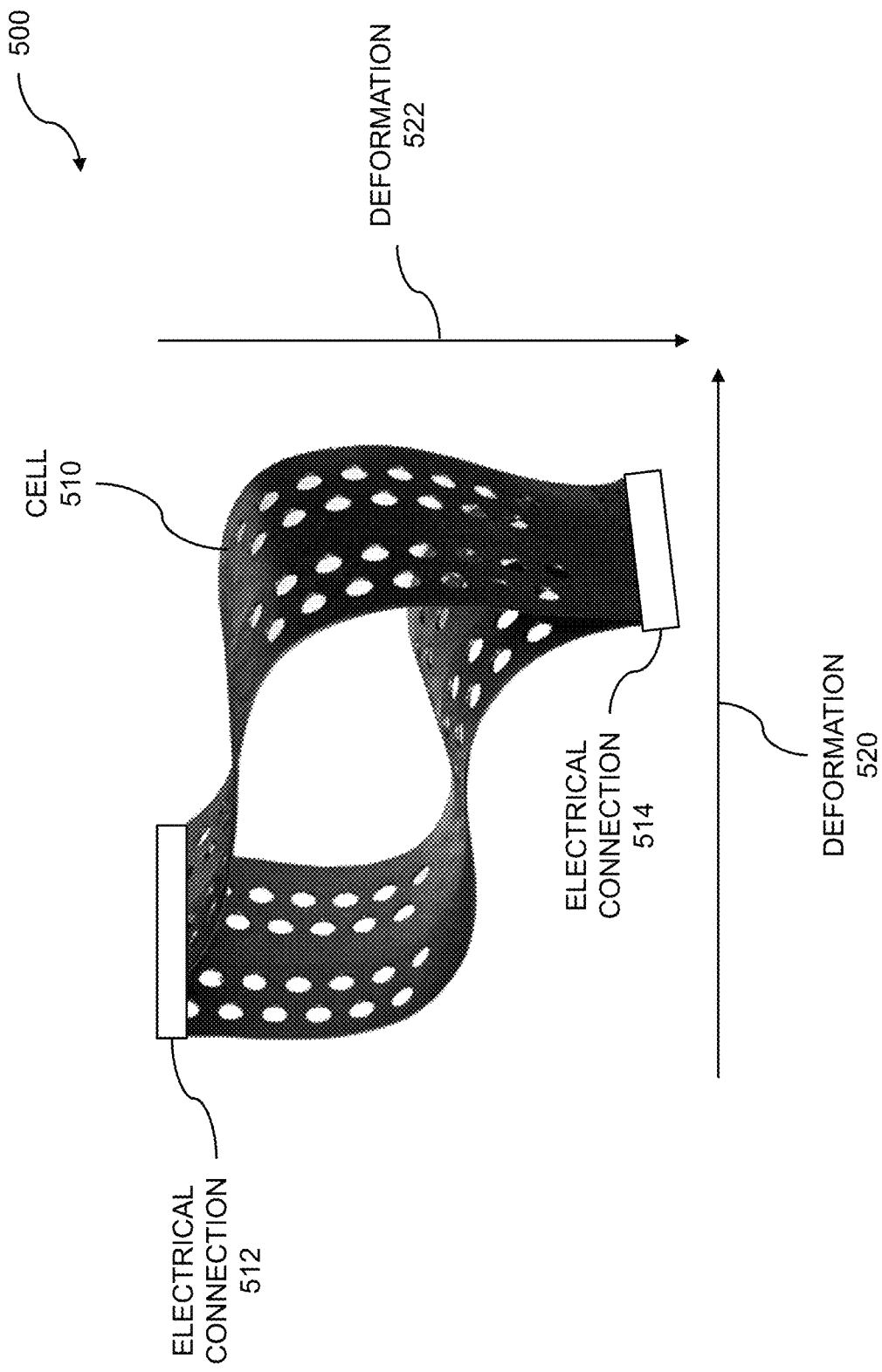
FIG. 5 shows an example structure of a honeycomb cell.

FIG. 5 shows an example structure 500 of a honeycomb cell 510. As shown, each cell 510 may include electrical connections 512, 514 for interfacing with other cells or connection layers. The electrical connections 512, 514 may comprise one or more flex printed circuits, flexible conductive films or wires, and/or one or more swivel or ball joints. In some embodiments, the electrical connections 512, 514 may be provided within or in connection with one or more physical connectors, such as latches or swivel or ball joints, that enable cells 510 to be securely joined to one another while still allowing each cell to move independently of other cells. However, in some implementations, cells 510 may be secured to one another such that some or all cells have only one or two degrees of freedom relative to other cells. By implementing a more rigid structure of cells 510, energy that otherwise may have been expended to move the cells relative to one another may instead deform the cells, allowing additional energy to be captured. However, a rigid structure of cells 510 can reduce the ability of a matrix structure associated with the cells to ripple, which in turn can limit the amount of energy that can be captured from the cells. Accordingly, one or both of the physical and electrical connections between cells 510 or between cells and other components of the systems described herein may need to be judiciously selected in order to maximize power production.

When the cell 510 is deformed through vertical deformation 522 and/or horizontal deformation 520, a voltage may be produced across the electrical connections 512, 514 that can be harvested and stored as energy in an energy storage system. For example, the deformation of the cell 510 may cause piezoelectric dots or other kinetically activated materials disposed on or in connection with the cell to experience deformation and produce a voltage, and electrical conductors connecting the dots to each other and to the electrical connections 512, 514 may enable the voltage to be used to generate a current in order to charge an energy storage system. In some embodiments, the cells 510 may include perforations in the material from which they are formed, as shown in FIG. 5. These perforations not only reduce the weight of the cells 510 but also allow fluids such as water or air to flow more freely through the cell. Such perforations can be advantageous in situations where system weight needs to be minimized or where energy collection using the cells 510 can negatively impact other systems.

For example, in a wave pool, cells 510 could be disposed along the walls on the edges of the pool to absorb energy from the waves and to reduce turbulence and allow patrons to more safely exit the pool. Using perforations in the cells 510 may reduce the effectiveness of the cells at calming the water, which may work well when there is no particular need to calm the water. This may be desired if the wave pool is strictly limited to adult use such that safety may not be a large concern. However, in a wave pool intended for use by children, using perforations in the cells 510 may not result in enough of a calming effect, and so cells used in such an environment may include fewer or no perforations.

In some embodiments, the perforations may be able to be selectively opened and/or closed. In this way, if cells 510 are used in a sail and high wind conditions are detected or the weather conditions are otherwise determined to be unsafe, the cells may be automatically or manually converted from not having perforations to having perforations. In some embodiments, an appropriate voltage applied to electrical connections 512, 514, or a portion thereof, may cause perforations in the cells 510 to open or close. This may be accomplished using sacrificial components, adjustable components, and/or sliding components, such as louvers. If desired, appropriate components, such as sliding components, can be used to modulate the size of perforations in the cells 510 such that the perforations can be set to be opened, closed, half opened, 25% opened, and so on. In some embodiments, cells 510 with perforations may be able to be automatically or manually swapped out with cells that do not have perforations or other cells. Accordingly, cells 510 may be modular in nature such that an associated matrix layer can comprise modular elements that can be arranged as desired. For example, cells with larger perforations may be installed or used near the center of a sail, while cells with smaller or no perforations may be installed or used near the outside edges of a sail.

The size of the cells 510 may be determined as a function of their intended use. For example, cells intended to be used in clothing can be manufactured having significantly smaller dimensions (e.g., having a longest dimension of up to about ¼ inch) than cells intended to be used in sails for sailboats (e.g., having a longest dimension of up to about 6 inches) or industrial applications (e.g., having a longest dimension of up to 6 feet or longer). Accordingly, the size of cells 510 should be selected as a function of the intended usage.

Generally, the more energy that is available to be harvested, the larger the cells 510 can be. However, smaller cells 510 may be used in situations where a large amount of energy is available to be harvested, such as when mechanical agitation is expected to be of low average intensity but high overall energy, which may be expected from an ocean wave, for example.

Figure 6:
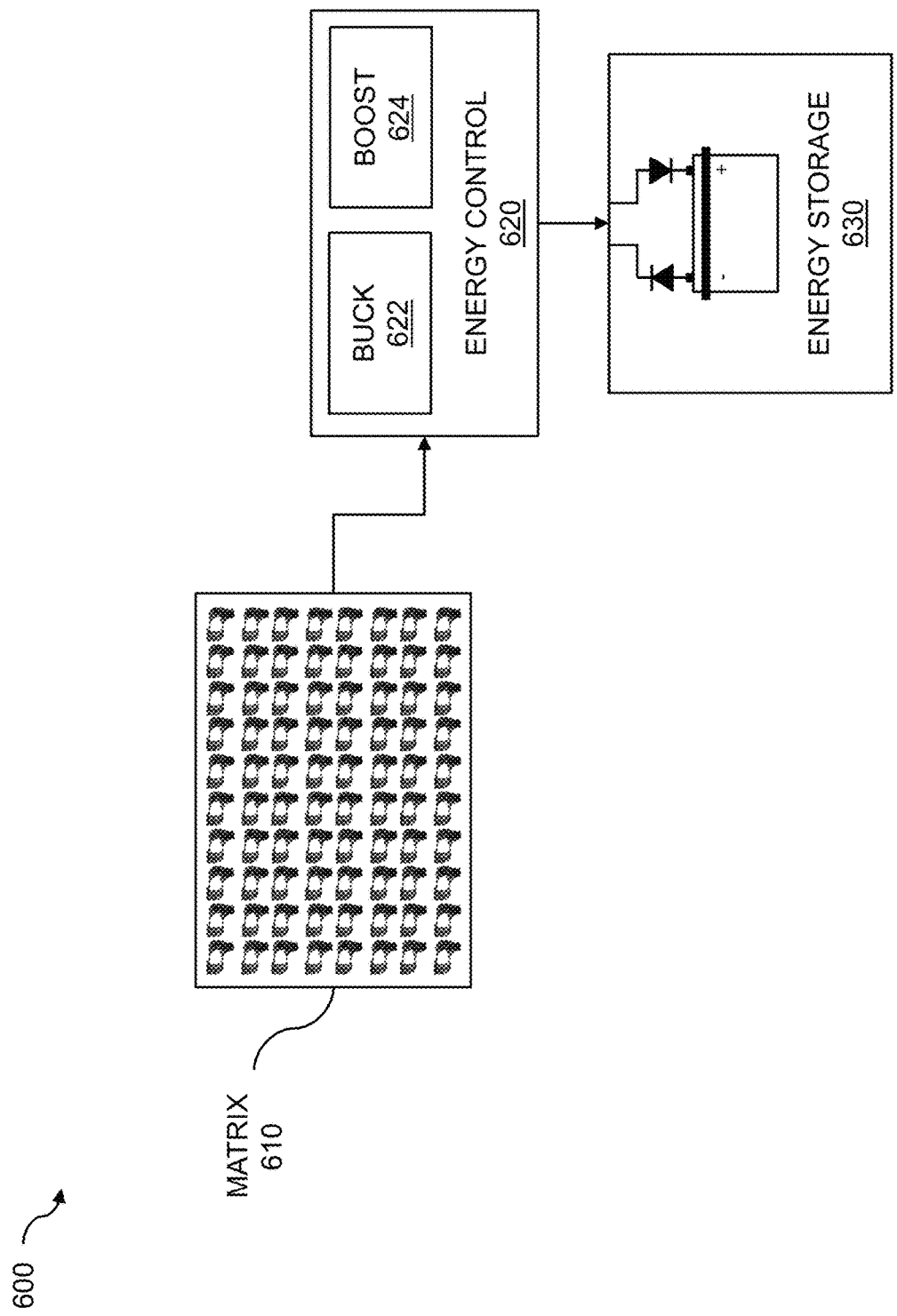
FIG. 6 illustrates a block diagram for energy harvesting from kinetic fabric.

FIG. 6 illustrates a block diagram 600 for energy harvesting from kinetic fabric. In order to efficiently harvest energy from a flexible matrix 610, an energy control system 620 may be used to implement buck 622 and boost 624 functions. Buck 622 and boost 624 functions may attempt to maintain the voltage derived from the energy source layer associated with the matrix 610 at a usable level so that it can be stored in an energy storage system 630 or used for other purposes. For example, if the matrix 610 is exposed to very high forces of mechanical agitation, it may produce a higher voltage than would be safe to use in charging the energy storage system 630. Thus, the buck 622 function may reduce the voltage so that the energy derived from the high forces of mechanical agitation can still be exploited. On the other hand, if the matrix 610 produces voltages that are slightly too low to be usable for charging the energy storage system 630, the boost 624 function may increase the voltage while slightly decreasing the current such that the lower voltages can still be used to charge the energy storage system. Generally, the buck 622 and boost 624 functions may condition the electrical output of the matrix 610 as needed in order to be able to charge the energy storage system 630 using the electrical output.

The energy control system 620 can be configured to prevent providing the energy storage system 630 with inadequate or excessive voltage, which may otherwise discharge or damage the energy storage system. For example, in some embodiments, the energy control system 620 may physically disconnect any connections with the energy storage system 630 when overvoltage or undervoltage conditions, either from the matrix 610 or the energy storage system 630, are detected. Additionally or alternatively, the energy control system 620 may only make a connection with the energy storage system 630 when an appropriate voltage is determined as being able to provide energy to the energy storage system.

In some embodiments, the energy control system 620 and/or energy storage system 630 may include one or more fuses or circuit breakers that prevent overvoltage or overcurrent conditions. As shown in FIG. 6, the energy storage system 630 may include two or more diodes to prevent unintentional discharging of the energy storage system 630. However, in some embodiments, the energy control system 620 may include the necessary circuitry to prevent unintentional discharge of the energy storage system 630, thus allowing the diodes shown in the energy storage system of FIG. 6 to be eliminated if desired.

Figure 7:
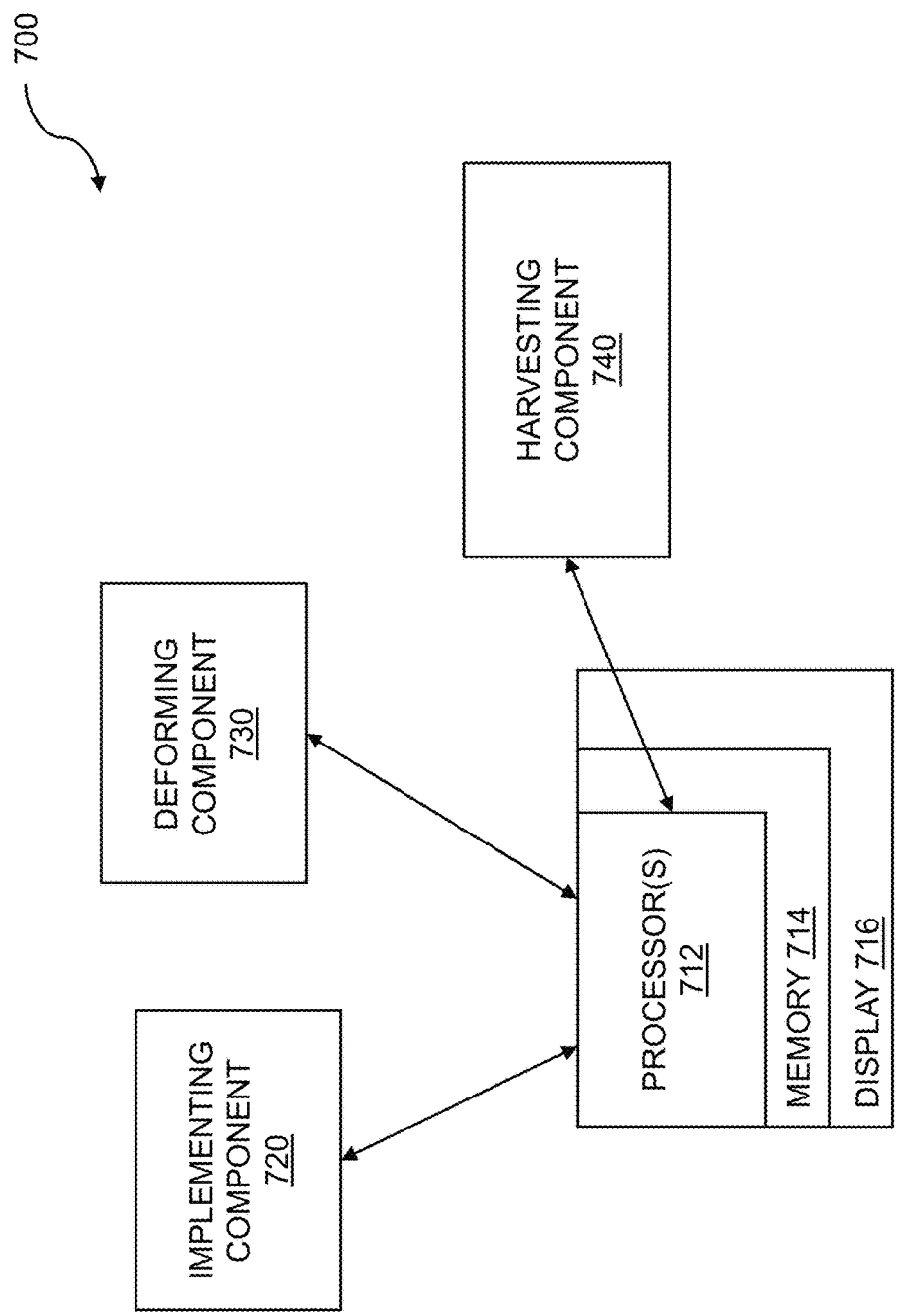
FIG. 7 is a system for energy harvesting using kinetic fabric.

FIG. 7 is a system 700 for energy harvesting using a kinetic fabric. The system 700 may include one or more processor(s) 712, a memory 714, and an optional display 716 for interacting with or monitoring the system. The system 700 may include an implementing component 720 for implementing a kinetic fabric to be used in a kinetically-activated energy production system. The kinetic fabric comprises a three-dimensional, layer-based flexible matrix that regains shape after deformation. The kinetic fabric further comprises a kinetically activated energy source layer supported between layers of the flexible matrix. The kinetic fabric further comprises a flexible electrical connection providing an electrical path between the energy source layer and a terminal on the flexible matrix. The system may further include a harvesting component 740 for harvesting energy from the energy source layer through the terminal on the flexible matrix, while a deforming component 730 deforms the kinetic fabric with mechanical agitation.

In some embodiments, the memory 714 may contain preconfigured settings for controlling one or more of the implementing component 720, deforming component 730, and harvesting component 740. For example, the preconfigured settings may cause perforations in a cell of a matrix to open or close under certain detected or user-input conditions, such as high winds or storms. As another example, the preconfigured settings may control an axis of alignment or an angle relative to an energy source, such as wind, of a flexible matrix. The memory 714 may also define other subroutines that can be automatically executed under certain conditions or manually executed by a user. The memory 714 may define subroutines that can deploy or otherwise implement a kinetic fabric using the implementing component 720. For example, the memory 714 may contain instructions for manufacturing a kinetic fabric, either in full or in part, which may be executed by the processor 712 to control the implementing component 720. As another example, the memory 714 may contain instructions for raising a sail comprising a kinetic fabric, which may be executed by the processor 712 to control the implementing component 720. Generally, the memory 714 can be used to store any information relevant to the systems and methods disclosed herein, and the processor 712 can execute and instructions stored in the memory or otherwise provided to the processor. When desired, a user may interact with or monitor operations of the processor 712 using display 716 and/or one or more user input devices, such as a mouse or keyboard, to provide instructions to the memory 714 or the processor.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A method for energy production comprising:
   implementing a kinetic fabric for use in a kinetically-activated energy production system, wherein the kinetic fabric comprises:
      a three-dimensional, layer-based flexible matrix, wherein the flexible matrix regains shape after deformation, comprising;
         a kinetically activated energy source layer, wherein the energy source layer is supported between layers of the flexible matrix; and
         a flexible electrical connection providing an electrical path between the energy source layer and a terminal on the flexible matrix;
   deforming the kinetic fabric with mechanical agitation; and
   harvesting energy from the energy source layer through the terminal on the flexible matrix.

2. The method of claim 1 wherein the energy source layer comprises a piezoelectric layer.

3. The method of claim 1 wherein the energy source layer comprises a triboelectric layer.

4. The method of claim 1 wherein the energy source layer comprises a combination of piezoelectric and triboelectric materials.

5. The method of claim 1 wherein the energy source layer comprises a combination of two or more of piezoelectric, triboelectric, and thermoelectric materials.

6. The method of claim 1 wherein the flexible electrical connection includes one or more diodes for conditioning energy created by the energy source layer.

7. The method of claim 1 wherein the flexible matrix comprises substantially non-stretchable material.

8. The method of claim 1 wherein the flexible matrix comprises a honeycomb structure.

9. The method of claim 8 wherein the honeycomb structure is substantially aligned along a single axis.

10. The method of claim 1 wherein the flexible matrix is woven into a fabric.

11. The method of claim 10 wherein the fabric is coupled to a moving vehicle.

12. The method of claim 10 wherein the fabric is part of a flag.

13. The method of claim 1 further comprising an additional flexible electrical connection, wherein the additional flexible electrical connection provides an additional terminal on the flexible matrix.

14. The method of claim 13 wherein the terminal and the additional terminal provide a voltage source.

15. The method of claim 14 further comprising an electrical energy storage system, wherein the electrical energy storage system is powered by voltage developed across the terminal and the additional terminal.

16. The method of claim 15 wherein the electrical energy storage system includes conversion of higher voltage developed across the terminal and the additional terminal to a lower voltage.

17. The method of claim 15 wherein the electrical energy storage system includes conversion of lower voltage developed across the terminal and the additional terminal to a higher voltage.

18. The method of claim 1 wherein the mechanical agitation includes centripetal force against the flexible matrix.

19. The method of claim 1 wherein the mechanical agitation includes contact forces on the flexible matrix.

20. The method of claim 1 wherein the mechanical agitation includes curvilinear motion of the flexible matrix.

21. The method of claim 20 wherein the curvilinear motion includes wind rippling of the flexible matrix.

22. The method of claim 1 wherein the kinetic fabric further comprises additional kinetically activated energy source layers, wherein the additional kinetically activated energy source layers are interspersed within the flexible matrix.

23. An apparatus for energy production comprising:
a kinetic fabric for use in a kinetically-activated energy production system, wherein the kinetic fabric comprises:
  a three-dimensional, layer-based flexible matrix, wherein the flexible matrix regains shape after deformation, comprising;
    a kinetically activated energy source layer, wherein the energy source layer is supported between layers of the flexible matrix; and
    a flexible electrical connection providing an electrical path between the energy source layer and a terminal on the flexible matrix.

24. A computer system for energy production comprising:
a memory which stores instructions;
one or more processors attached to the memory wherein the one or more processors, when executing the instructions which are stored, are configured to:
implement a kinetic fabric for use in a kinetically-activated energy production system, wherein the kinetic fabric comprises:
  a three-dimensional, layer-based flexible matrix, wherein the flexible matrix regains shape after deformation, comprising;
    a kinetically activated energy source layer, wherein the energy source layer is supported between layers of the flexible matrix; and
    a flexible electrical connection providing an electrical path between the energy source layer and a terminal on the flexible matrix; and
harvest energy from the energy source layer through the terminal on the flexible matrix while the kinetic fabric is deformed with mechanical agitation.

* * * * *